W. A. GREENLAW.
FLEXIBLE PIPE JOINT.
APPLICATION FILED APR. 24, 1908.
930,071.
Patented Aug. 3, 1909.
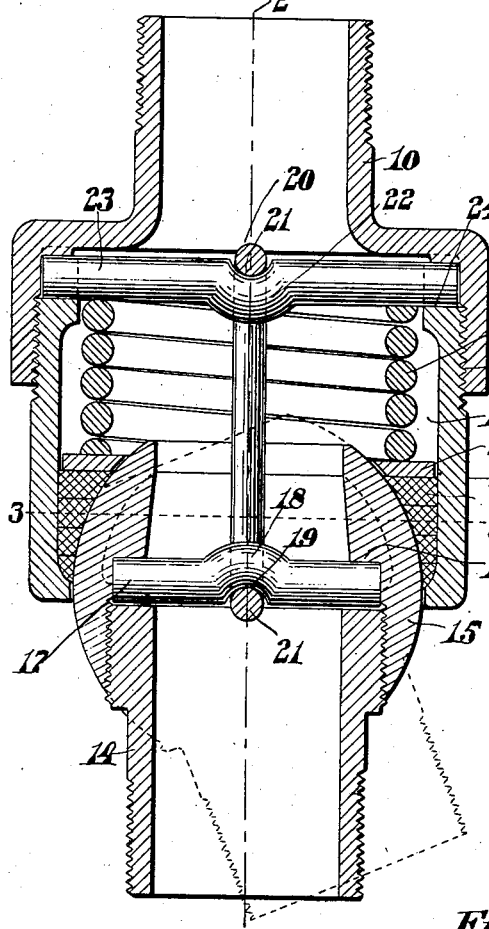
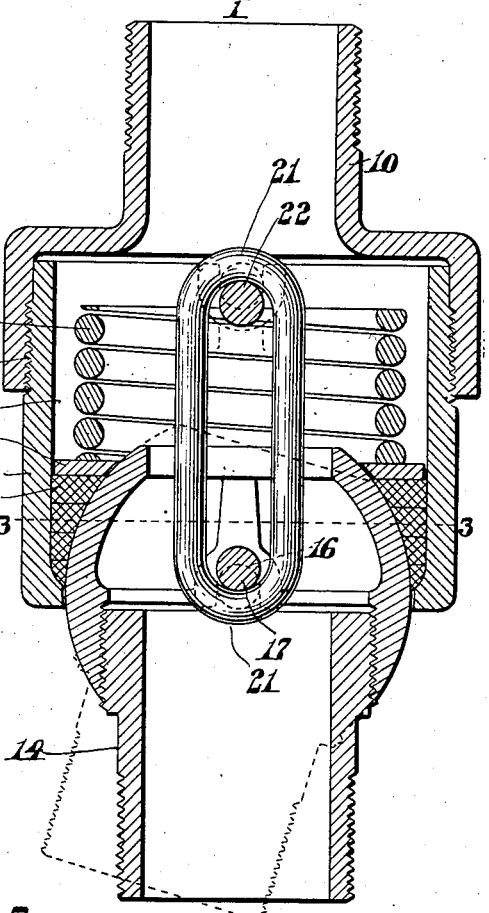
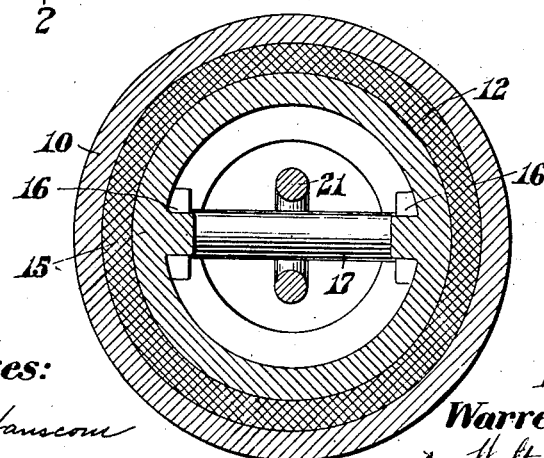
Witnesses:
Howard Hanscom
Nathan C. Lombard
Inventor:
Warren A. Greenlaw,
by Walter E. Lombard,
Atty.

UNITED STATES PATENT OFFICE.

WARREN A. GREENLAW, OF MELROSE HIGHLANDS, MASSACHUSETTS, ASSIGNOR TO THE GREENLAW MANUFACTURING COMPANY, OF BOSTON, MASSACHUSETTS, A CORPORATION OF MAINE.

FLEXIBLE PIPE-JOINT.

No. 930,071.  Specification of Letters Patent.  Patented Aug. 3, 1909.

Application filed April 24, 1908. Serial No. 429,097.

*To all whom it may concern:*

Be it known that I, WARREN A. GREENLAW, a citizen of the United States of America, and a resident of Melrose Highlands, in the county of Middlesex and State of Massachusetts, have invented certain new and useful Improvements in Flexible Pipe-Joints, of which the following is a specification.

This invention relates to flexible pipe joints and has for its object the production of a device whereby two pipe members may be joined together so that they may be moved into positions at various angles to one another, while at the same time leakage may be effectually prevented.

It has for a further object the provision of such a joint in which one of the pipe members is provided with a ball end adapted for insertion within an enlarged chamber in the other pipe member and prevented from displacement therefrom by means of an articulated connector interposed between said ball end of one pipe member and the enlarged end of the other pipe member.

It has for a further object the provision of means whereby the two pipe members are separated by means of a suitable spring acting upon a packing interposed between said members, which packing will be caused to impinge more firmly upon the outer surface of the ball end and the inner wall of the surrounding member whenever said ball end is moved farther within said enlarged chamber.

It consists further in certain novel features of construction and arrangement of parts which will be readily understood by reference to the description of the drawings and to the claims hereinafter given.

Of the drawings: Figure 1 represents a section of a pipe joint embodying the features of this invention. Fig. 2 represents a transverse section of the same, the cutting plane being on line 2—2 on Fig. 1, and Fig. 3 represents a horizontal section, the cutting plane being on line 3—3 on Figs. 1 and 2.

Similar characters designate like parts throughout the drawings.

In the drawings, 10 represents a pipe member which has threaded thereto at 11 the cup-shaped member 12 provided with an enlarged chamber 13 in axial line with the pipe member 10. The coöperating pipe member 14 has threaded or otherwise secured thereto a ball end 15 which is adapted for insertion into the chamber 13 and is provided on its inner wall with diametral seats 16 adapted to receive the ends of a cylindrical cross member 17 having midway of its length a bent portion 18. When the member 17 is in place the lowest point 19 in the concave portion of the bend 18 is in the center of the ball 15. This concaved portion forms a seat for a link connector 20 the opposite end of which is provided with a similar seat 21 in the bent portion 22 of a member 23 extending diametrically across the inner end of the cup-shaped end 12 and having its outer end supported in seats 24 formed upon said cup-shaped end.

Interposed between the outer surface of the ball 15 and the inner wall of the cup-shaped end 12 are a plurality of packing members 25 which members are adapted to pack the joint between the cup-shaped end 12 and the ball end 15 and prevent leakage from the chamber 13. These packing rings 25 are forced into contact with the wall of the chamber 13 and the outer face of the wall 15 by means of the spring 26 bearing upon a follower ring 27 interposed between said spring 26 and said packing rings 25.

It is obvious that the ring 20 limits the outward movement of the ball 15 while at the same time it is free to move in any direction about the point 19 to permit the pipe members 10 and 14 to be moved into positions at various angles to each other. During such movement about the center 19 the packing rings 25 will effectually operate to prevent leakage. Should any strain be brought to bear to cause the ball end 15 to move farther into the chamber 13, the spring 26 will act upon the packing rings 25 to force it against the walls of the chamber 13 and the outer face of the ball end 15, thus more effectually packing the joint and resisting the movement of the ball end in that direction, the spring 26 returning the parts to their normal position as soon as the cause of a movement in this direction has been removed.

It is believed that the operation of the invention and the many advantages of a joint of this kind will be thoroughly understood without further description.

Having thus described my invention, I claim:

1. In a flexible pipe joint, the combination of a pipe member provided with a cup-shaped end; a second pipe member having a ball-shaped end positioned in said cup-shaped end and having diametral seats on its inner wall; a diametrical member the ends of which rest within said seats; a member within and extending diametrically of said cup-shaped end; and a connector adapted to prevent the outward movement of said ball end interposed between said members and universally supported on each.

2. In a flexible pipe joint, the combination of a pipe member provided with a cup-shaped end; a second pipe member having a ball-shaped end positioned in said cup-shaped end and having diametral seats on its inner wall; a diametrical member the ends of which rest within said seats; a member within and extending diametrically of said cup-shaped end; and a link interposed between and positioned at the center of said members adapted to prevent the outward movement of said ball end.

3. In a flexible pipe joint, the combination of a pipe member provided with a cup-shaped end; a second pipe member having a ball-shaped end provided with diametral seats therein; a cylindrical member within said seats having a central bend therein; a member secured within said cup-shaped end; and a connecting link between said members.

4. In a flexible pipe joint, the combination of a pipe member provided with a cup-shaped end; a second pipe member having a ball-shaped end provided with diametral seats therein; a cylindrical member within said seats having a central bend therein; a member secured within said cup-shaped end; a connecting link between said members; and a spring-pressed packing between the outer surface of said ball end and the inner wall of said cup-shaped end.

5. In a flexible pipe joint, the combination of a pipe member provided with a cup-shaped end; a second pipe member having a ball-shaped end provided with diametral seats therein; a cylindrical member within said seats having a central bend therein; a member secured within said cup-shaped end; and a connecting link between said members, the bearing point between which and said bent portion being at the center of said ball.

6. In a flexible pipe joint, the combination of a pipe member provided with a cup-shaped end; a cylindrical member secured thereto having diametral seats at its inner end; a second pipe member having a ball-shaped end provided with diametral seats therein; a diametrical member the ends of which rest in the seats on said ball end; a diametrical member the ends of which rest in the seats on said cylindrical member; and a connector between said diametrical members.

7. In a flexible pipe joint, the combination of a pipe member provided with a cup-shaped end; a cylindrical member secured thereto having diametral seats at its inner end; a second pipe member having a ball-shaped end provided with diametral seats therein; a diametrical member the ends of which rest in the seats on said ball end; a diametrical member the ends of which rest in the seats on said cylindrical member; a connector between said diametrical members; a packing between the outer surface of said ball end and the inner wall of said cylindrical member; and a spring interposed between said packing and the diametrical member seated on said cylindrical member.

8. In a flexible pipe joint, the combination of a pipe member provided with a cup-shaped end; a second pipe member having a ball-shaped end provided with diametral seats therein; a cylindrical diametrical member the ends of which rest within said seats; a member within and extending diametrically of said cup-shaped end; a connector between said members; a packing between the outer surface of said ball end and the inner wall of said cup-shaped member; and a spring interposed between said packing and the member extending diametrically of the cup-shaped end.

Signed by me at 7 Water st., Boston, Mass., this 15th day of April, 1908.

WARREN A. GREENLAW.

Witnesses:
WALTER E. LOMBARD,
NATHAN C. LOMBARD.